March 29, 1966 J. W. SENDERS 3,243,798

CATHODE RAY TUBE DISPLAY OF DATA RECORDED ON A TAPE LOOP

Filed May 31, 1962 4 Sheets-Sheet 1

INVENTOR.
JOHN W. SENDERS

BY Roger W. Jensen

ATTORNEY.

March 29, 1966 J. W. SENDERS 3,243,798

CATHODE RAY TUBE DISPLAY OF DATA RECORDED ON A TAPE LOOP

Filed May 31, 1962 4 Sheets-Sheet 2

INVENTOR.
JOHN W. SENDERS

BY Roger W. Jensen

ATTORNEY.

CATHODE RAY TUBE DISPLAY OF DATA RECORDED ON A TAPE LOOP

Filed May 31, 1962 4 Sheets-Sheet 3

INVENTOR.
JOHN W. SENDERS
BY Roger W. Hansen
ATTORNEY.

March 29, 1966 J. W. SENDERS 3,243,798

CATHODE RAY TUBE DISPLAY OF DATA RECORDED ON A TAPE LOOP

Filed May 31, 1962 4 Sheets-Sheet 4

INVENTOR.
JOHN W. SENDERS

BY Roger W. Jensen
ATTORNEY.

United States Patent Office
3,243,798
Patented Mar. 29, 1966

3,243,798

CATHODE RAY TUBE DISPLAY OF DATA RECORDED ON A TAPE LOOP

John W. Senders, Minneapolis, Minn., assignor to Honeywell Inc., a corporation of Delaware Filed May 31, 1962, Ser. No. 198,830
4 Claims. (Cl. 340—324)

This invention pertains to improvements in recording devices and more particularly to a device for providing a visual display of the recent history of an "in progress" phenomena.

In any scientific investigation one of the most common problems faced is the selection of data. Much of the data taken are repetitious and tells the observer only that the system under examination is doing exactly what it was expected to do. This information is of relatively little value; the data of interest being the unusual or the unplanned.

Prior art recording devices, such as pen-recorders or magnetic drum or tape type "fault" recorders, suffer from serious disadvantages. Pen-recorders are limited to recording data subsequent to a fault, or else are required to record an enormous number of uninteresting data in order to assure that the conditions leading up to the fault are preserved. In other words, if the pen-recorder is adapted to begin recording after the fault has already occurred, the only information obtained is that which occurs after fault. If information as to conditions preceding the occurrence of the fault is desired, it is necessary for the pen-recorder to operate continuously. As mentioned previously, this results in the recording of an enormous number of uninteresting and comparatively useless data.

Magnetic drum or tape type "fault" recorders will, after a fashion, record conditions leading up to the occurrence of a fault, however, these type recorders require that the observer know in advance what type of fault is going to occur. In other words, the scientist must decide in advance what will be considered a fault in the operation of the system so that he can then program the recorder to preserve the data preceding and subsequent to this fault. If the type of fault is unknown the magnetic drum or tape type recorder is useless.

In the present invention, on the other hand, information is visually displayed for on-line observation and data not of interest are destroyed, while unusual, unexplained or otherwise interesting data are permanently recorded or analyzed.

In a broad sense, the present invention includes a temporary storage device comprising an endless loop of magnetic tape which is driven at a substantially constant speed. Mounted adjacent to the tape is a magnetic recording head by which input data are recorded on the tape. A first readout head is mounted adjacent to the tape and rotates around the inside of the tape loop. The first readout head is connected to a visual display device, such as a cathode ray oscilloscope, which will present a display of the recorded information. A second readout head is mounted adjacent to the tape and is adapted to readout, upon command, the information recorded on the tape loop and to feed this information to a data analyzer or to a permanent storage device. An erase head is mounted adjacent to the tape just preceding the recording head. The speed of rotation of the first readout head is substantially greater than the speed of the tape loop and therefore information recorded on the tape loop will be read out several times by the first readout head before the information is erased by the erase head.

A modification of the above described invention provides an "on-line" cross-correlation operation. The modification utilizes a dual channel recording head for recording separate data on two channels, or tracks, on the tape loop, and two separate rotating readout heads, one for reading the information recorded on each channel. The modification also uses a dual channel readout head for feeding recorded information to a permanent storage or analyzer when desired, and a dual channel erase head to remove information from the tape loop. By progressively shifting the phase between the two rotating readout heads a cross-correlation of the data on the dual channels can be accomplished.

It is one object of this invention therefore to provide an improved recording device.

Another object of this invention is to provide an improved recording device which will produce a visual display of the recent history of an "in progress" phenomena.

Another object of this invention is to provide an improved recording device which will produce a cross- correlation between data recorded on separate channels of the device.

These and other objects of my invention will become apparent to those skilled in the art upon consideration of the accompanying specification, claims, and drawings of which:

Figure 1:
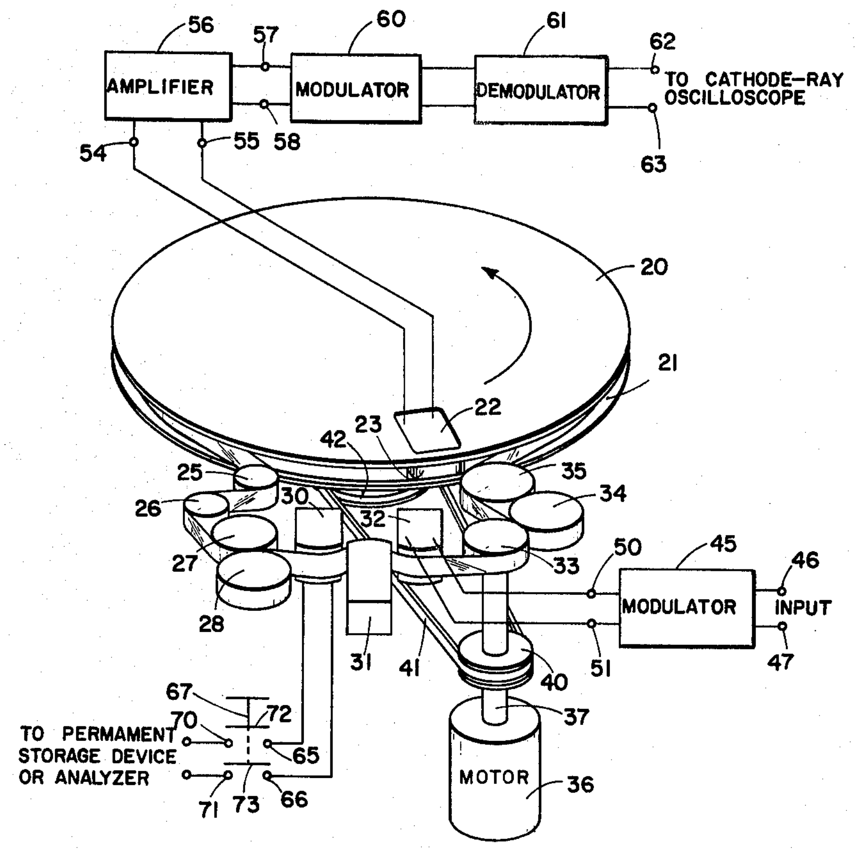
FIGURE 1 shows a first embodiment of the invention.

Referring to FIGURE 1 there is shown a substantially circular disc 20 having a circumferential groove 21 around the edge thereof. A magnetic readout head 22 is mounted in the disc so that the face 23 of the head 22 forms a portion of the groove 21.

An endless loop of magnetic tape 24 lies in groove 21 and is threaded through an idler wheel 25, an idler wheel 26, an idler wheel 27, an idler wheel 28, a magnetic readout head 30, an erase head 31, a magnetic record head 32, a drive wheel 33, an idler wheel 34 and an idler wheel 35. The various idler wheels, magnetic heads, and the drive wheel act to hold the endless tape in the groove 21 around the circumference of disc 20, as well as to provide a means for driving the tape loop.

A motor 36 is connected by means of a shaft 37 to drive wheel 33 and acts to drive the endless tape loop at a constant speed.

A pulley 40 is mounted on shaft 37. A belt 41 is connected from pulley 40 to a pulley 42 which is coaxially connected to disc 20. Disc 20 and pulley 42 are fixed with respect to each other and are mounted so as to be able to rotate around their common axis.

A modulator 45 has input terminals 46 and 47 adapted to be connected to a source of input signals and output terminals 50 and 51 which are connected to magnetic record head 32.

Magnetic readout head 22 is connected to an input terminal 54 and an input terminal 55 of an amplifier 56. The output of amplifier 56 is connected to input terminals 57 and 58 of a modulator 60. Amplifier 56 and modulator 60 are mounted on disc 20 although in FIGURE 1 they are shown separated for clarity. A coaxial rotary transformer is used to provide coupling between modulator 60 and demodulator 61 and is explained hereinafter in conjunction with the explanation of FIGURES 4 and 5.

The output of modulator 60 is connected to a demodulator 61 having output terminals 62 and 63 which are adapted to be connected to a visual display device, such as a cathode ray oscilloscope (not shown).

Readout head 30 is connected to a first set of stationary contacts 65 and 66 of a double pole single throw switch 67. Switch 67 further has stationary contacts 70 and 71 and movable contacts 72 and 73. Fixed contacts 70 and 71 are adapted to be connected to a permanent storage device or analyzer.

Figure 2:
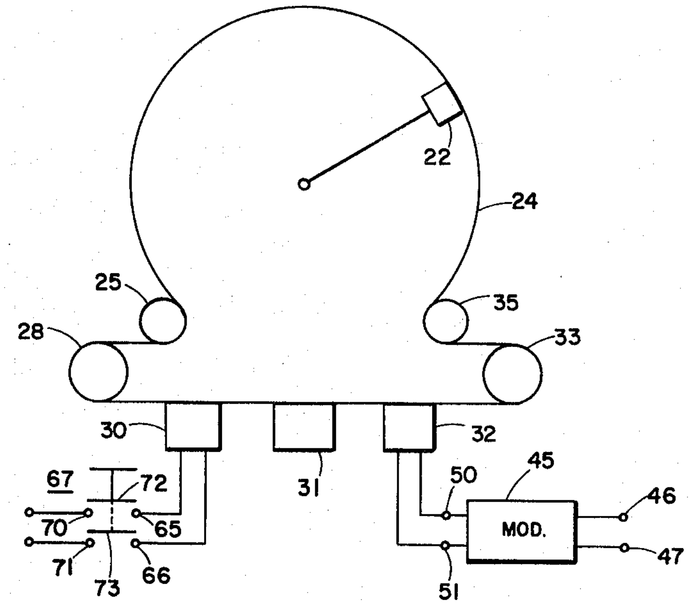
FIGURE 2 is a schematic representation of the diagram of FIGURE 1.

Referring to FIGURE 2 there is shown a schematic representation of the structure of FIGURE 1. Elements of FIGURE 2 are given the same numerical designation as the corresponding structural elements of FIGURE 1.

The operation of the embodiment shown in FIGURES 1 and 2 is as follows: assume that motor 36 is energized and is turning shaft 37. Idler wheel 34 holds tape 24 tight against drive wheel 33 and hence the endless tape 24 will be driven at some linear speed. At the same time the belt 41 on pulleys 40 and 42 cause disc 20, and hence readout head 22, to rotate about its axis at some speed considerably higher than the linear speed of the endless tape 24.

When an input signal appears at input terminals 46 and 47 it will modulate a carrier frequency in modulator 45 and the modulated carrier will appear at output terminals 50 and 51 of modulator 45 and will be coupled to record head 32, where it will be recorded on endless tape loop 24. The information recorded on the endless loop 24 will be driven around the loop in the groove of disc 20 and will eventually be erased from the magnetic tape by erase head 31. However, during the time that the recorded information is traveling around the loop the readout head 22 located in the groove of disc 20 is rotating around the inside of the tape loop at a speed considerably higher than the speed of the tape. Therefore, readout head 22 repetitively reads the information recorded on tape loop 24.

The information read by readout head 22 is coupled to the input terminals 54 and 55 of amplifier 56. The output of amplifier 56 is fed to the input of modulator 60 where it is used to modulate a high frequency carrier. The output of modulator 60 is coupled to a demodulator 61, the output of which is fed to output terminals 62 and 63 where it is adapted to be connected to a visible display device such as a cathode ray oscilloscope.

The particular purposes of modulator 45, amplifier 56, modulator 60, and demodulator 61, as well as the specific circuits used, will be explained more fully hereinbelow in the discussion of FIGURES 3, 4 and 5.

As explained hereinbefore, the input information is recorded on the endless tape loop and the rotating readout head 22 repetitively reads out the recorded information and displays this information on a cathode ray oscilloscope. When the recorded information has made a complete revolution around the loop, it is erased from the tape by erase head 31 and new information is recorded on the tape. However, if something of particular interest occurs that the investigator wishes to preserve for further analysis or study, switch 67 is closed so that movable contact 72 shorts contacts 65 and 70 while movable contact 73 shorts fixed contacts 66 and 71. At this time readout head 30 will read the information stored on tape 24 as the tape moves past the readout head and this information will be coupled through switch 67 where it is adapted to be further connected to a permanent storage device or to an analyzer. When the information of interest has been sent to a permanent storage, switch 67 can again be opened and new input information observed.

It is readily apparent that this invention offers an accurate and convenient means to monitor information without the necessity of wasting large amounts of recording paper or tape.

Figure 3:
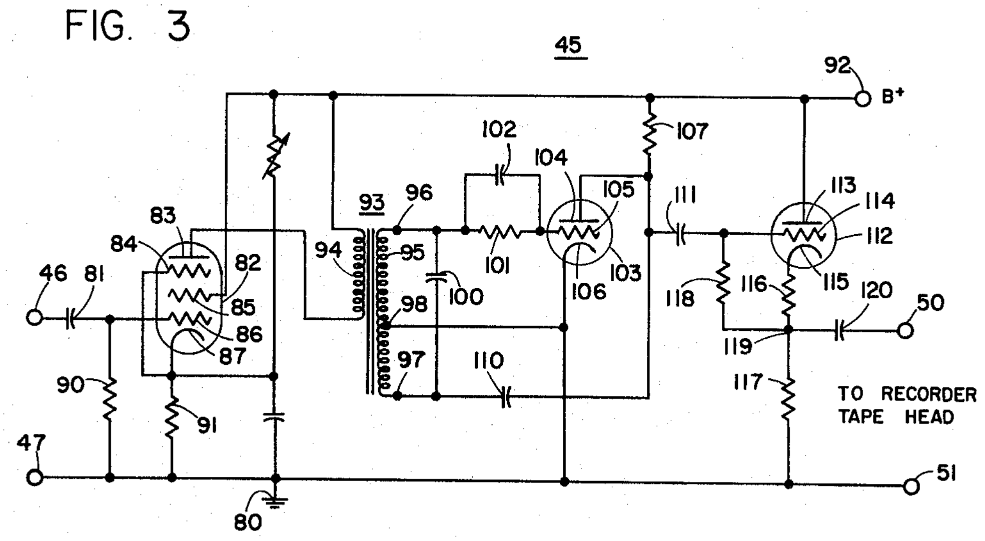
FIGURE 3 is a schematic representation of a modulator used in FIGURE 1.

FIGURE 3 shows a schematic representation of modulator 45. Referring to FIGURE 3 there is shown input terminals 46 and 47. Input terminal 47 is connected directly to ground 80. Input terminal 46 is connected through a capacitor 81 to a control grid 96 of a pentode 82. Pentode 82 further has a plate 83, a suppresor grid 84, a screen grid 85 and a cathode 87. Control grid 86 is further connected to ground 80 by means of a resistor 90. Cathode 87 of pentode 82 is directly connected to suppresor grid 84 and is further connected by means of a resistor 91 to ground 80. Screen grid 85 of pentode 82 is directly connected to a source of energizing potential 92. Plate 83 of pentode 82 is connected by means of a primary 94 of a transformer 93 to the positive potential source 92. Transformer 93 further has a secondary winding 95 having an end terminal 96, an end terminal 97, and a center tap terminal 98.

Terminal 96 of transformer secondary winding 95 is connected by means of a capacitor 100 to terminal 97 of secondary winding 95. Terminal 96 is further connected by means of a resistor 101 in parallel with a capacitor 102 to a control grid 105 of a triode 103. Triode 103 further has a plate 104 and a cathode 106. Cathode 106 of triode 103 is connected directly to ground 80 and is further connected to the center tap terminal 98 of secondary winding 95. Plate 104 of triode 103 is connected by means of a resistor 107 to the potential source 92, and by means of a capacitor 110 to end terminal 97 of transformer secondary winding 95. Plate 104 is further connected by means of a capacitor 111 to a control grid 114 of a triode 112. Triode 112 further has a plate 113 and a cathode 115. Cathode 115 of triode 112 is connected by means of a resistor 116 in series with a resistor 117 to ground 80. Control grid 114 of triode 112 is connected by means of resistor 118 to a junction 119 between resistors 116 and 117. Plate 113 of triode 112 is directly connected to a potential source 92. Junction 119 is further connected by means for a capacitor 120 to output terminal 50. Output terminal 51 is directly connected to ground 80.

Input signals at input terminal 46 are coupled through capacitor 81 to the control grid of amplifier 82. These signals are amplified in tube 82 and are fed to the primary winding 94 of transformer 93. The secondary winding of transformer 93 along with triode 103 and its associated circuitry form a Hartley oscillator.

The output from amplifier 82 frequency modulates the Hartley oscillator 103. The output of the Hartley oscillator, at the plate 104 of triode 103, is coupled through capacitor 111 to the grid 114 of cathode follower 112. The output of cathode follower 112 is coupled through capacitor 120 to output terminal 50. As explained previously in conjunction with the explanation of FIGURE 1, output terminals 50 and 51 are directly connected to record head 32.

Figure 4:
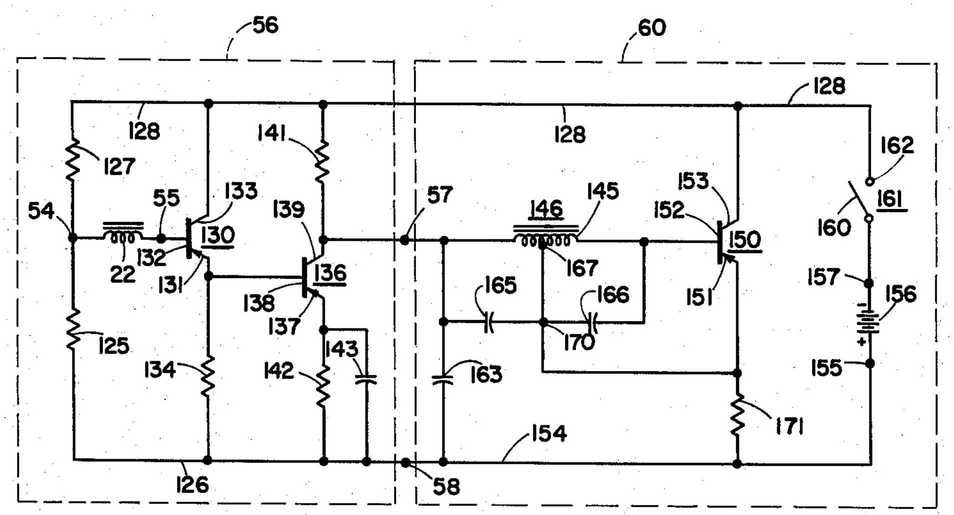
FIGURES 4 and 5 are schematic representations of an amplifier, modulator and demodulator used in FIGURE 1.
Figure 5:
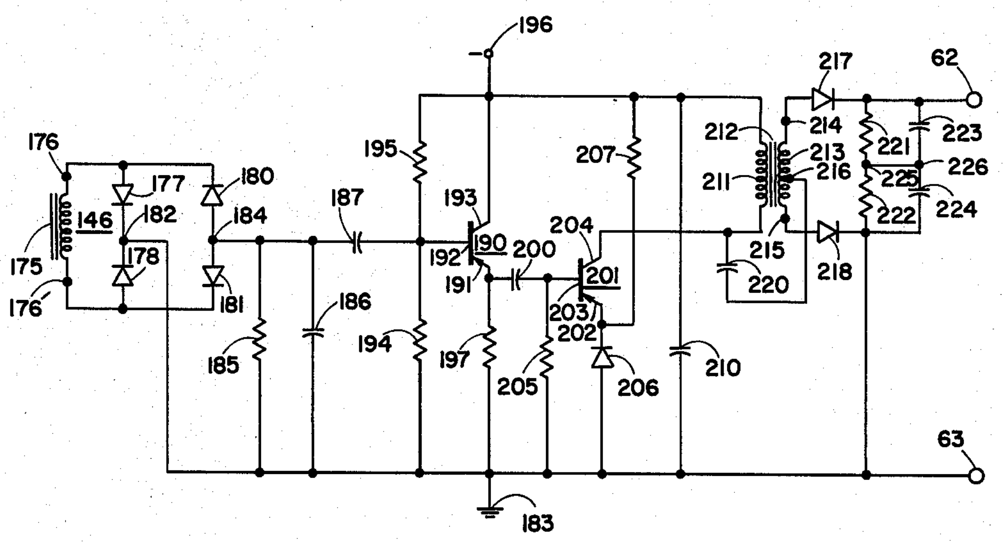

The amplifier, modulator, and demodulator circuits, 56, 60 and 61 respectively, are shown in FIGURES 4 and 5. Referring to FIGURE 4 there is shown readout head 22 connected to input terminals 54 and 55. Input terminal 54 is connected by means of a resistor 125 and a conductor 126 to output terminal 58, and by means of a resistor 127 to a conductor 128.

Terminal 55 is directly connected to a base 132 of a transistor 130. Transistor 130 further has an emitter 131 and a collector 133. Collector 133 of transistor 130 is directly connected to conductor 128. Emitter 131 of transistor 130 is connected by means of a resistor 134 to conductor 126. Emitter 131 is further connected to a base 138 of a transistor 136. Transistor 136 further has an emitter 137 and a collector 139.

Collector 139 of transistor 136 is connected by means of a resistor 141 to conductor 128. Emitter 137 of transistor 136 is connected to conductor 126 by means of a resistor 142 in parallel with a capacitor 143. Collector 139 of transistor 136 is further connected to output terminal 57.

Terminal 57 is connected by means of a primary 145 of a rotary transformer 146 to a base 152 of a transistor 150. Transistor 150 further has had emitter 151 and a collector 153.

Terminal 58 is connected by means of a conductor 154 to a terminal 155 of a source of energizing potential 156. A terminal 157 of the energizing potential source 156 is connected to a movable contact 160 of a centrifugal switch 161. A fixed contact 162 of centrifugal switch 161 is directly connected to conductor 128.

Terminal 57 is further connected by means of a capacitor 163 to conductor 154, and by means of a capacitor 165 in series with a capacitor 166 in the base 152 of transistor 150. A center tap 167 of the primary 145 of rotary transformer 146 is connected to a junction 170 between capacitors 165 and 166. Junction 170 is directly connected to the emitter 151 of transistor 150, and is further connected by means of a resistor 171 to conductor 154.

Primary 145 of rotary transformer 146, along with capacitors 163, 165 and 166, transistor 150 and its associated circuitry, form a high frequency Hartley oscillator having a nominal center frequency of approximately five megacycles.

FIGURE 5 shows a secondary 175 of rotary transformer 146. Secondary winding 175 has an end terminal 176 and an end terminal 176'. End terminal 176 of secondary 175 is connected by means of a diode 177 in series with a reverse poled diode 178 to terminal 176' of secondary 175, and by means of a reverse poled diode 180 in series with a diode 181 to terminal 176' of secondary 175. A junction 182 between diodes 177 and 178 is connected to ground 183. A junction 184 between diodes 180 and 181 is connected to ground 183 by means of a resistor 185 in parallel with a capacitor 186. Junction 184 is further connected by means of a capacitor 187 to a base 192 of a transistor 190. Transistor 190 further has an emitter 191 and a collector 193.

Base 192 of transistor 190 is connected by means of a resistor 194 to ground 183, and by means of a resistor 195 to a negative potential source 196. Collector 193 of transistor 190 is directly connected to the negative potential source 196. Emitter 191 of transistor 190 is connected to ground 183 by means of a resistor 197, and is further connected by means of a capacitor 200 to a base 203 of a transistor 201. Transistor 201 further has an emitter 202 and a collector 204.

Base 203 of transistor 201 is connected to ground 183 by means of a resistor 205. Emitter 202 of transistor 201 is connected to ground by means of a reverse poled diode 206, and is further connected to the negative potential source 196 by means of a resistor 207. Potential source 196 is connected to ground 193 by means of a capacitor 210.

Collector 204 of transistor 201 is connected to the negative potential source 196 by means of a primary winding 211 of a transformer 212. Transformer 212 further has a secondary winding 213 having end terminals 214 and 215 and a center tap terminal 216.

End terminal 214 of secondary winding 213 is connected by means of a diode 217 to output terminal 62. End terminal 215 of secondary 213 is connected by means of a diode 218 to ground 183. Output terminal 63 is connected to ground 183. Center tap terminal 216 of secondary winding 213 is connected to the collector 204 transistor 201 by means of capacitor 220. Output terminal 62 is connected by means of a resistor 221 in series with resistor 222 to output terminal 63, and by means of capacitor 223 in series with capacitor 224 to output terminal 63. A junction 225 between resistors 221 and 222 is directly connected to a junction 226 between capacitors 223 and 224.

The operation of the circuits of FIGURES 4 and 5 is as follows: Centrifugal switch 161 is a part of modulator 60 and is mounted on the disc 20. As disc 20 rotates centrifugal switch 161 will close when the disc is at its operating speed. When switch 161 closes movable contact 160 will be in connection with fixed contact 162 and oscillator 150 and transistors 130 and 136 will be energized by battery source 156.

Readout head 22 is connected to the base of transistor 130. Transistors 130 and 136 comprise a conventional resistance-coupled amplifier. The output of the amplifier, at the collector 139 of transistor 136 is fed to output terminal 57 and from terminal 57 to the input of the Hartley oscillator circuit. This signal modulates the Hartley oscillator carrier frequency. The output from the oscillator is taken through rotary transformer 146. The output of the Hartley oscillator appears across the secondary winding 175 of coaxial rotary transformer 146. The circuit shown in FIGURE 5 comprises a two-stage demodulator which restores the original signal frequencies for presentation upon the visual display device such as a cathode ray oscilloscope. The output on FIGURE 5 appears at terminal 62 which would be coupled to the cathode ray oscilloscope (not shown).

Amplifier 56, modulator 60 and demodulator 61 are required because of the use of rotary transformer 146 as the means for feeding the information from the rotating readout head 22 to external circuits. The efficiency of rotary transformer 146 is greatly increased when it is energized by a high frequency signal rather than a low frequency signal.

While the use of the rotary transformer is desirable in some instances, it should be obvious to those skilled in the art that this is by no means the only method of feeding information from the rotating head 22 to the external circuits. For instance, in some applications simple slip rings could be employed.

Assume that a first set of data is recorded on one channel of a magnetic tape loop while a second set of data is recorded on a second channel of the tape loop. If separate rotating readout heads are used to read the data on each channel, then by progressively shifting the phase between the two readout heads an "on-line" cross-correlation can be accomplished.

Figure 6:
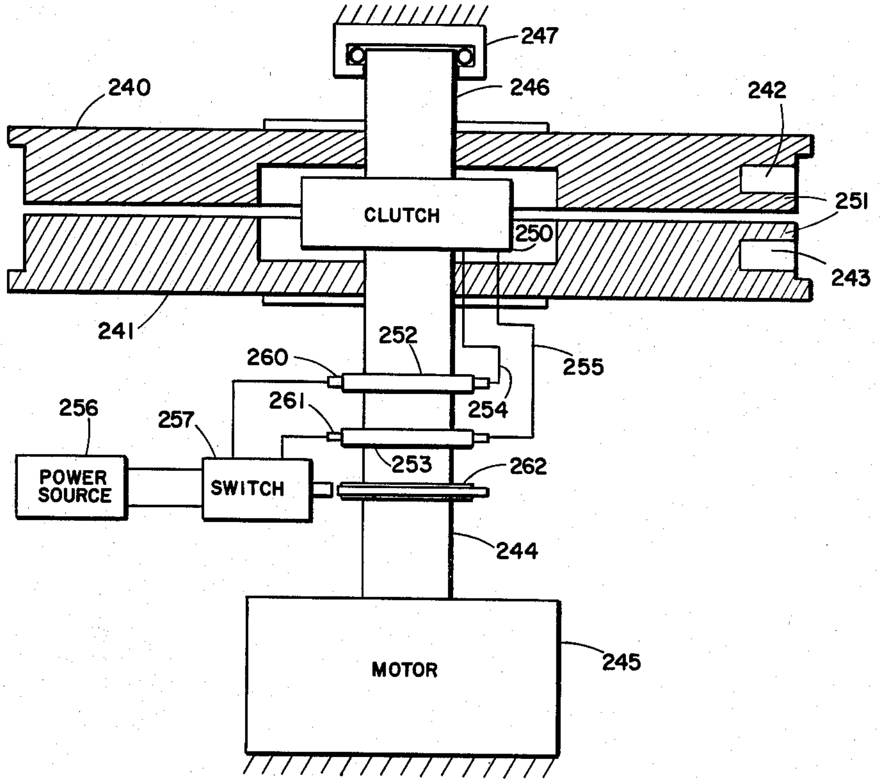
FIGURE 6 shows a second embodiment of the invention.

Referring to FIGURE 6 there is shown a first disc 240 and a second disc 241, both discs being substantially the same as the disc 20 described in conjunction with the explanation of FIGURE 1. Disc 240 has a magnetic readout head 242 mounted in the disc so that the face of the readout head is flush with the edge of the disc. Similarly, disc 241 has a magnetic readout head 243 mounted in the disc so that the face of the readout head 243 is flush with the edge of disc 241.

Disc 241 is rigidly mounted on a shaft 244 which in turn is driven by a motor 245. Shaft 244 is coaxial with the disc 241.

Disc 240 is rigidly mounted on a shaft 246, shaft 246 being coaxial with disc 240. One end of shaft 246 is supported by a bearing 247.

Shafts 244 and 246 are axially aligned and are connected by means of a suitable clutch arrangement, such as a powdered metal clutch, 250. When clutch 250 is energized, the rotation of shaft 244 drives shaft 246 and consequently disc 240.

The lower surface of disc 240 is contiguous with the upper surface of disc 241. The upper edge of disc 240 and the lower edge of disc 241 each have a protruding lip around the circumference thereof thereby forming a groove 251 around the circumference of the contiguously mounted discs.

An endless loop of magnetic tape (not shown) rides in groove 251 and is driven by a drive wheel (not shown) in a manner similar to that described in conjunction with the operation of FIGURE 1. A pair of record heads (not shown) each record input data on separate channels, or tracks, of the endless loop of magnetic tape.

A pair of slip ring 252 and 253 are rigidly mounted around the circumference of shaft 244. A pair of power leads 254 and 255 of clutch 250 are respectively connected to slip ring 252 and slip ring 253.

A power source 256 is connected through a normally closed switch 257 to a pair of brushes 260 and 261. Brush 260 is mounted so as to ride on slip ring 252 while brush 261 is mounted so as to ride on slip ring 253. A cam 262 is mounted on shaft 244 and operates to open switch 257 once each revolution of shaft 244.

The operation of the device of FIGURE 6 is as follows: power source 256 supplies power through switch 257, brushes 260 and 261, and leads 254 and 255 to clutch 250, thereby energizing clutch 250. Motor 245 drives shaft 244 and, since clutch 250 is energized, shaft 246, thereby causing discs 240 and 241 to revolve.

Magnetic readout heads 242 and 243, of discs 240 and 241 respectively, read the information recorded on the dual tracks of the endless loop of magnetic tape. Once each revolution of shaft 244 cam 262 opens switch 257 thereby deenergizing clutch 250. When clutch 250 is deenergized disc 240, and hence readout head 242, is shifted in phase with respect to readout head 243. By progressively shifting the phase between readout heads 242 and 243 a cross-correlation operation "on-line" is accomplished. The shift in phase between readout head 242 and 243 occurs during the non-readout segment of the discs revolution in order to maintain identical speeds during the read operation.

It is to be understood that while I have shown specific embodiments of my invention that this is for the purpose of illustration only and that my invention is to be limited solely by the scope of the appended claims.

What I claim is:

1. Apparatus of the class described comprising:
an endless loop of magnetic tape, said tape being adapted to be driven at a constant speed;
a dual channel magnetic recording head mounted adjacent to said tape and adapted to record information on a first and second channel on said tape;
first and second readout heads each mounted adjacent to said tape and adapted to rotate around the inside of said tape loop, said first readout head reading the information recorded on the first channel on said tape loop and said second readout head reading the information recorded on the second channel on said tape loop, the speed of rotation of said first and second readout heads being substantially greater than the speed of said tape;
means for progressively shifting the phase between said first and second readout heads;
a visual display device connected to said first and second readout heads so as to present a visual display of the information read from the first and second channels on said tape loop;
and a dual channel erase head mounted adjacent to said tape and adapted to erase, after a predetermined time, the information recorded on the first and second channels of said tape loop.

2. Apparatus of the class described comprising:
an endless loop of magnetic tape, said tape being adapted to be driven at a constant speed;
a dual channel magnetic recording head mounted adjacent to said tape and adapted to record information on a first and second channel on said tape;
first and second readout heads each mounted adjacent to said tape and adapted to rotate around the inside of said tape loop, said first readout head reading the information recorded on the first channel on said tape loop and said second readout head reading the information recorded on the second channel on said tape loop, the speed of rotation of said first and second readout heads being substantially greater than the speed of said tape;
means for progressively shifting the phase between said first and second readout heads;
a dual channel readout head mounted adjacent to said tape and adapted to readout, upon command, the information recorded on the first and second channels of said tape loop;

and a dual channel erase head mounted adjacent to said tape and adapted to erase, after a predetermined time, the information recorded on the first and second channels of said tape loop.

3. Apparatus of the class described comprising:
an endless magnetic tape loop;
means for driving said tape loop;
means for recording dual channel information on said tape loop;
means for erasing the dual channel information from said tape loop after a predetermined time;
first and second readout means each adapted to repetitively read the information recorded on one of said dual channels on said tape loop during said predetermined time;
means for progressively shifting the phase between said first and second readout heads;
display means connected to said first and second readout means;
third readout means adapted to read out, upon command, the dual channel information recorded on said tape loop;
and permanent storage means connected to said third readout means.

4. Apparatus of the class described comprising:
an endless loop of magnetic tape, said tape being adapted to be driven at a constant speed;
a dual channel magnetic recording head mounted adjacent to said tape and adapted to record information on a first and second channel on said tape;
first and second readout heads each mounted adjacent to said tape and adapted to rotate around the inside of said tape loop, said first readout head reading the information recorded on the first channel on said tape loop and said second readout head reading the information recorded on the second channel on said tape loop, the speed of rotation of said first and second readout heads being substantially greater than the speed of said tape;
means for progressively shifting the phase between said first and second readout heads;
a visual display device connected to said first and second readout heads so as to present a visual display of the information read from the first and second channels on said tape loop;
a dual channel readout head mounted adjacent to said tape and adapted to readout, upon command, the information recorded on the first and second channels of said tape loop;
permanent storage means connected to said dual channel readout head;
and a dual channel erase head mounted adjacent to said tape and adapted to erase, after a predetermined time, the information recorded on the first and second channels of said tape loop.

References Cited by the Examiner

UNITED STATES PATENTS

| | | | |
|---|---|---|---|
| 2,903,677 | 9/1959 | Curtis | 340—174.1 |
| 2,932,002 | 4/1960 | Keiser | 179—100.2 |
| 2,947,978 | 8/1960 | Poylo et al. | 179—100.2 |
| 3,015,810 | 1/1962 | Latham et al. | 340—174.1 |
| 3,042,754 | 7/1962 | McManis | 179—100.2 |
| 3,044,045 | 7/1962 | Kemp | 340—174.1 |

NEIL C. READ, *Primary Examiner.*

H. I. PITTS, *Assistant Examiner.*